(12) United States Patent
Hashimoto et al.

(10) Patent No.: US 8,739,909 B2
(45) Date of Patent: Jun. 3, 2014

(54) BATTERY FRAME STRUCTURE FOR AUTOMOBILE

(75) Inventors: Narikazu Hashimoto, Shimonoseki (JP); Tsunetake Tsuyoshi, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 115 days.

(21) Appl. No.: 13/424,672

(22) Filed: Mar. 20, 2012

(65) Prior Publication Data

US 2012/0247850 A1    Oct. 4, 2012

(30) Foreign Application Priority Data

Mar. 29, 2011    (JP) .................................. 2011-073457

(51) Int. Cl.
*B60R 16/04*    (2006.01)

(52) U.S. Cl.
USPC ........................................ 180/68.5; 429/100

(58) Field of Classification Search
USPC ............ 180/68.5; 403/292, 306; 429/99, 100, 429/96
See application file for complete search history.

(56) References Cited

U.S. PATENT DOCUMENTS

| | | | | |
|---|---|---|---|---|
| 1,420,670 A | * | 6/1922 | Schuette | 403/292 |
| 1,649,945 A | * | 11/1927 | Booth | 301/10.1 |
| 2,657,756 A | * | 11/1953 | Brogren | 180/68.5 |
| 5,079,860 A | * | 1/1992 | Nugent | 40/780 |
| 5,449,100 A | * | 9/1995 | Eckhart | 224/509 |
| 5,458,393 A | * | 10/1995 | Benedyk | 296/203.01 |
| 5,498,096 A | * | 3/1996 | Johnson | 403/267 |
| 5,501,289 A | * | 3/1996 | Nishikawa et al. | 180/68.5 |
| 5,547,116 A | * | 8/1996 | Eckhart | 224/509 |
| 5,558,949 A | * | 9/1996 | Iwatsuki et al. | 429/99 |
| 5,567,259 A | * | 10/1996 | Gregory et al. | 156/242 |
| 5,581,868 A | * | 12/1996 | Bisch | 29/525.08 |
| 6,022,070 A | * | 2/2000 | Ashina et al. | 296/205 |
| 6,048,035 A | * | 4/2000 | Chen | 301/30 |
| 6,085,854 A | * | 7/2000 | Nishikawa | 180/68.5 |
| 6,188,574 B1 | * | 2/2001 | Anazawa | 361/695 |
| 6,203,099 B1 | * | 3/2001 | Iwatsuki | 296/204 |
| 6,491,286 B1 | * | 12/2002 | Hadfield et al. | 256/21 |
| 7,445,400 B2 | * | 11/2008 | Takeuchi | 403/292 |
| 7,850,390 B2 | * | 12/2010 | Lisbona | 403/382 |
| 8,371,768 B1 | * | 2/2013 | Wu | 403/294 |
| 2004/0118739 A1 | * | 6/2004 | Koefelda | 206/527 |
| 2005/0173170 A1 | * | 8/2005 | Miyajima et al. | 180/68.5 |
| 2005/0260488 A1 | * | 11/2005 | Zhou et al. | 429/99 |

(Continued)

FOREIGN PATENT DOCUMENTS

| | | |
|---|---|---|
| JP | 7-187016 | 7/1995 |
| JP | 9-104240 | 4/1997 |
| JP | 9-240288 | 9/1997 |
| JP | 2009-193942 | 8/2009 |

*Primary Examiner* — Katy M Ebner
*Assistant Examiner* — Brodie Follman
(74) *Attorney, Agent, or Firm* — Oblon, Spivak, McClelland, Maier & Neustadt, L.L.P.

(57) ABSTRACT

A battery frame includes an outer frame (1) which has a generally rectangular shape in planar view and a lower plate (2) which is joined to the lower surface of the outer frame and made from an aluminum alloy. The outer frame (1) has a pair of frame members (3, 4) which have an identical shape and are respectively made of aluminum alloy hollow extruded material bent at 90° at two portions in the longitudinal direction and joined to each other so that the ends (3a) of one frame member (3) face the ends (4a) of the other frame member (4).

5 Claims, 3 Drawing Sheets

(56) References Cited

U.S. PATENT DOCUMENTS

| | | |
|---|---|---|
| 2006/0115324 A1* | 6/2006 | Zenda et al. .................. 403/292 |
| 2007/0033899 A1* | 2/2007 | Kaida et al. .................. 52/783.1 |
| 2007/0206989 A1* | 9/2007 | Wagner et al. ................ 403/297 |
| 2010/0162558 A1* | 7/2010 | Hiratsuka et al. ............ 29/623.1 |
| 2010/0190048 A1* | 7/2010 | Yang et al. .................... 429/158 |
| 2010/0297469 A1* | 11/2010 | Aota et al. .................... 428/615 |
| 2011/0143179 A1* | 6/2011 | Nakamori ....................... 429/99 |
| 2012/0125704 A1* | 5/2012 | Kawaguchi et al. ......... 180/68.5 |
| 2012/0164500 A1* | 6/2012 | Loo et al. ........................ 429/82 |
| 2012/0177971 A1* | 7/2012 | Cicero et al. .................. 429/120 |
| 2012/0214025 A1* | 8/2012 | Moon et al. ....................... 429/7 |
| 2012/0247850 A1* | 10/2012 | Hashimoto et al. .......... 180/68.5 |
| 2013/0192914 A1* | 8/2013 | Nakamori .................... 180/68.5 |

* cited by examiner (a)

(b)

(c)

(a)

(b)

BATTERY FRAME STRUCTURE FOR AUTOMOBILE

FIELD OF THE INVENTION

This invention relates to a battery frame structure for an automobile, the structure consisting of an outer frame which has a generally polygonal shape in planar view and a lower plate which is jointed to the lower portion of the outer frame and made of aluminum alloy.

DESCRIPTION OF THE RELATED ART

JP-H7-187016A, JP-H9-104240A, JP-H9-240288A and JP-2009-193942A describe structures of battery frame for automobile, wherein the structure consists of an outer frame which is composed of a front cross frame, a rear cross frame and both side frames jointed in a rectangular shape in planar view, and lower plate which is jointed to a lower portion of the outer frame.

In the structure of the battery frame of JP-H7-187016A, each frame member constituting the outer frame is made from a steel sheet by press forming. The frame members are assembled together so as to form a rectangular shape in planar view, and jointed to each other at four corner portions. And, in the structure of the battery frame of JP-H9-104240A, JP-H9-240288A and JP-2009-193942A, each frame member constituting the outer frame made of an aluminum alloy hollow extruded material for weight reduction. These frame member are assembled together to form a rectangular shape in planar view, and jointed to each other at four corner portions.

Major components of outer frame constituting the above mentioned battery frame are four components as a front cross frame, a rear cross frame and two side frames on both sides. These frame members are arranged in a rectangular shape in planar view, and the members are jointed to each other generally by welding at four corner portions. However, this structure has following problems.
(1) The number of major components constituting the outer frame is large as four.
(2) The number of the welded portions is four so as to develop welding distortion. Particularly, in a case where the major components of the outer frame are aluminum hollow extruded materials, welding distortion is large, because the aluminum requires larger input current and has a higher coefficient of thermal expansion.

The present invention is made in view of these problems of the conventional battery frame structure. And, the object of the present invention is to reduce a component count, and simultaneously to eliminate or reduce a welding distortion which is conventionally caused by welding at four corner portions.

SUMMARY OF THE INVENTION

A battery frame structure for an automobile according to the present invention consists an outer frame which has a generally convex polygonal shape in planar view and a lower plate which is jointed to the lower surface of the outer frame and made from aluminum alloy. The outer frame consists of a pair of frame members which have an identical shape and jointed to each other so that the ends of one face to the ends of the other. And, the each frame member is made of an aluminum alloy hollow extruded material which is bent at a certain angle in a same plane at two or more portions in its longitudinal direction. Typically, the shape of the outer frame in planar view is a generally rectangular shape. In this case, the number of the bent portions of the each frame member is two, and the bending angle is set at 90° for both bent portions. It is noted that because each corner of the outer frame is bent at a certain curvature, it is represented as "generally convex polygonal (or generally rectangular)".

Arbitrarily, a hollow extruded material having a generally rectangular outline such as "⊡" shape and "⊡" shape with a cross wall can be used as the frame member, and rolled plate, extruded plate double skin shaped material (extruded material with face plates in a form of a pair of flat plates parallel to each other and a plurality of ribs which is formed between and integrally with the face plates to connect the face plates) and the likes can be used as the lower plate.

In the battery frame structure for an automobile according to the present invention, instead of four components as a front cross frame, rear cross frame and both side frame in the conventional structure, outer frame consists of two frame members which are bent, and therefore a component count is reduced. Further, the two frame members constituting the outer frame have an identical shape (both in sectional view and planar view), and therefore only a single specification of component is required so as to enhance productivity. Thereby, it is possible to reduce a cost of the battery frame structure.

In the battery frame structure for an automobile according to the present invention, instead of jointing by welding components of the outer frame at four corner portions as conventionally, the ends of two frame members are jointed to each other. Therefore, even if the jointing is made by welding, reduction of welding portions to two can reduce a welding distortion. Further, in the case of mechanical jointing, jointing at the end of the frame portion as a portion with a straight shape can be made easier than jointing at a corner portion.

In the battery frame structure for an automobile according to the present invention, while a process for bending an aluminum alloy hollow extruded material is required in a manufacturing process, the bending can be made in a short time, because aluminum alloy hollow extruded material is suitable for bending. Therefore, even in a case of jointing the two portions by welding, in comparison to a case of jointing the four corner portions by welding as conventionally required, the required time for manufacturing process can be shortened so as to enhance productivity. And the welding work itself is easer than that of a corner portion. Therefore, it is possible to reduce a cost of a battery frame structure.

In the conventional outer frame, since aluminum alloy hollow extruded materials are welded to each other at the corner portions where they intersect one another, a section module of the outer frame varies around the center of the corner. In such case, a sectional design of aluminum alloy extruded material should be made based on a portion having the lowest section module, and therefore a cross section property is too great at some positions so as to cause a weight increase. In contrast, in the outer frame according to the present invention, the corner portions are the bent portions of the aluminum alloy hollow extruded material and have a uniform sectional area through the center of the corner, and therefore section module does not vary around the center of the corner. Thereby, a design of an outer frame can be made based on an optimum constant sectional shape so that weight reduction can accordingly be made. It is noted that an outer frame is considerably large in size and weight, and therefore a weight reduction of this component significantly contributes a weight reduction of an entire automobile.

DETAILED DESCRIPTION OF THE PREFERRED EMBODIMENT

Hereinafter, it is illustrated a battery frame structures for an automobile according to the present invention with reference to FIGS. 1-5.

Figure 1:
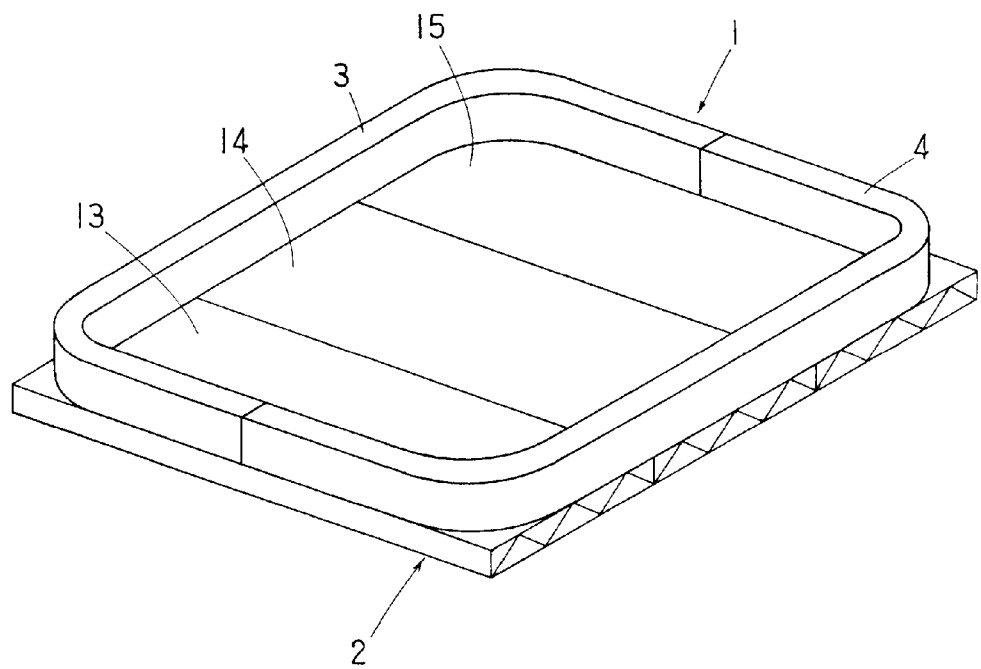
FIG. 1 is an overall perspective view of a battery frame structure according to the present invention.
Figure 2:
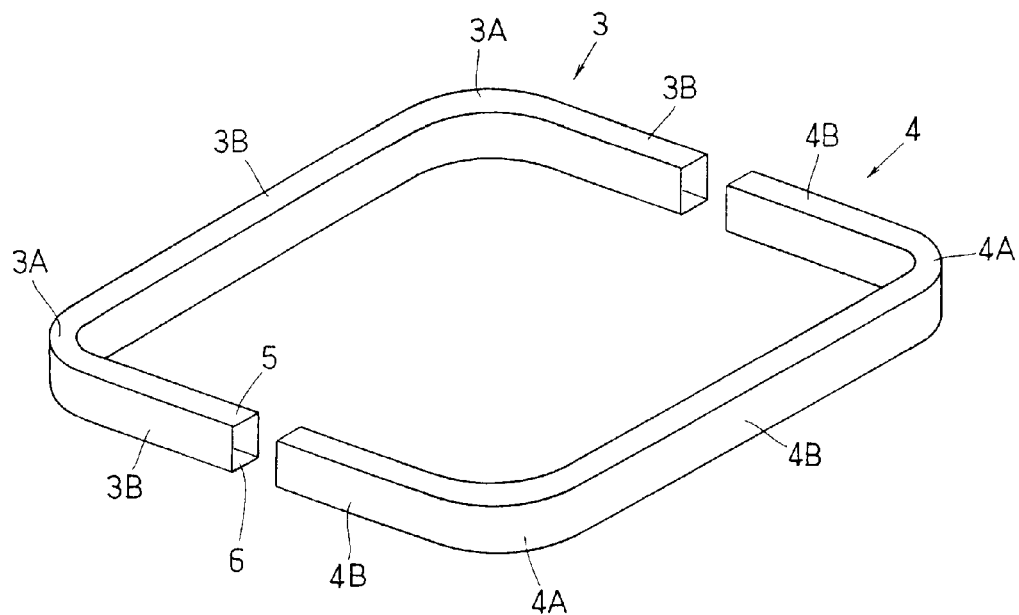
FIG. 2 is a perspective view of a frame member constituting an outer frame of the battery frame structure in FIG. 1.
Figure 3:
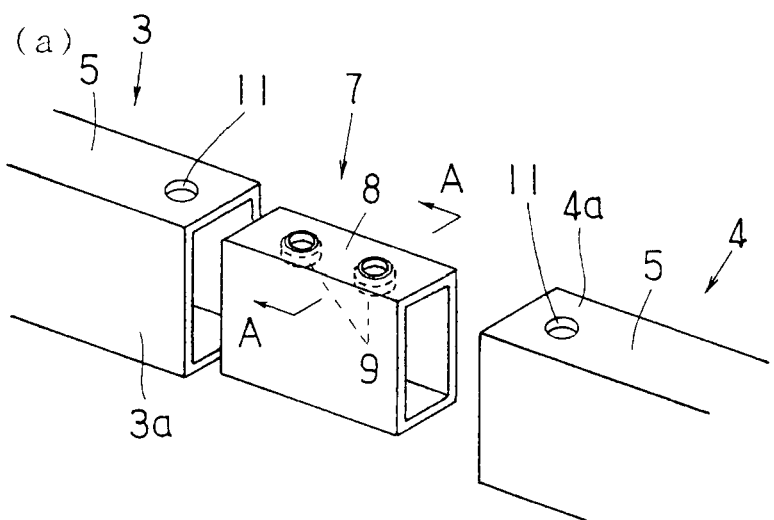
FIG. 3 shows a perspective view representing a substantial part of an example of a jointing configuration of the frame members to each other in (a), a sectional view taken along A-A of (a) in (b), and a side view representing a jointed shape in (c)
Figure 3:
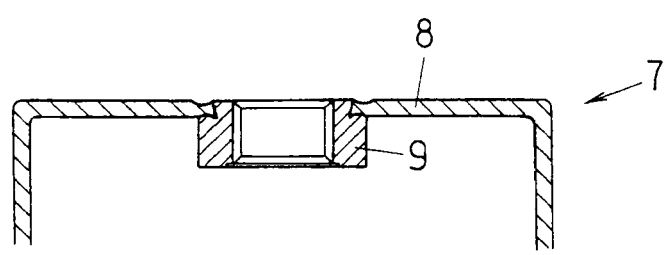
Figure 3:
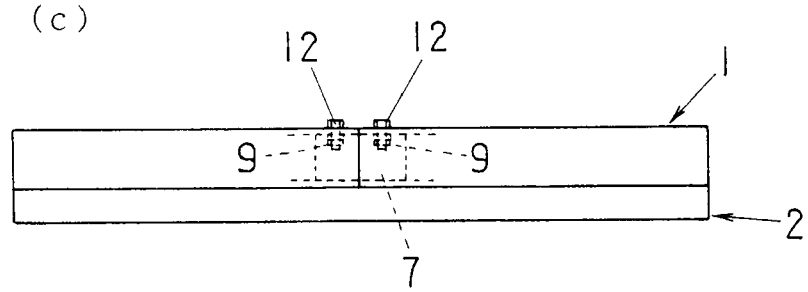

A battery frame shown in FIG. 1 consists of an outer frame 1 and a lower plate jointed to the lower surface of the outer frame 1 (representation of bolts and the likes are omitted). The outer frame 1 has a generally rectangular shape in planar view, and made of a pair of frame members 3, 4 which have a generally "C" shape in planar view and of which ends are jointed to each other. The frame members 3, 4 have an identical shape in planar view, and are respectively formed by bending aluminum alloy hollow extruded materials which have a uniform rectangular sectional shape ("□" shape) at 90° in a same plane at two portions in longitudinal direction. The bent regions 3A, 4A of the frame members 3, 4 are located between the non-bent regions 3B, 4B so as to form four corner portions of the outer frame 1. The bending of the two portions is made in a same plane so that horizontally located upper and lower webs 5, 6 of the frame members 3, 4 are bent in a plane respectively.

FIG. 3(a) shows an example of a jointing method of the ends of the frame members 3, 4 to each other wherein the ends 3a, 4a of the frame members 3, 4 are faced to each other, and a joint member 7 is placed between the ends 3a, 4a to be inserted into the hollow spaces of the ends 3a, 4a. The ends 3a, 4a are portions of said non-bended regions 3B, 4B. The joint member 7 is an aluminum alloy hollow extruded material having a rectangular sectional shape and a outline just to fit in the hollow space of the ends 3a, 4a of the frame members 3, 4, and has self piercing and clinch nuts 9, 9 which are publicly known (refer, for instance JP-2008-223877A with respect to the self piercing and clinch nuts) fixed at two positions on the inner surface of the upper web 8. A sectional view of FIG. 3(b) shows the self piercing and clinch nuts 9 fixed on the inner surface side of the upper web 8. On the upper web 5 of the ends 3a, 3b of the frame members 3, 4, bolt holes 11, 11 are formed at positions corresponding to the self piercing and clinch nuts 9.

The ends 3a, 3a are abutted to each other with the joint member 7 inserted in, and bolts 12, 12 (refer FIG. 3(c)) penetrate the bolt holes 11, 11 to be screwed in the self piercing and clinch nuts 9, 9 so that the frame members 3, 4 and the joint member 7 are fastened. Thereby, the frame member 3, 4 are jointed to each other at their ends 3a, 4a. The jointed state is shown in FIG. 3(c).

As shown in FIG. 1, the lower plate 2 consists of closely aligned three pieces of double skin shaped materials 13-15 having a rectangular shape in planar view.

As shown in FIG. 4(a), blind nuts 16 which are publicly known (refer, for instance JP-2009-255708A with respect to the blind nuts) are fixed on the lower webs 6 of the frame members 4 with an appropriate interval. The blind nuts 16 are inserted into the hollow space of the frame member 3, 4 from below and then fixed on the lower web 6. Meanwhile, the lower plate 2 has an upper face plate 17, a lower face plate and a rib 18. The rib is formed partially with a hole 19 (as a bolt hole) to contain a flange of the blind nut 16, and a lower plate 21 formed with a bolt hole 22.

To joint the lower plate 2 and the outer frame 1, the lower plate 2 is positioned below the outer frame 1 (after jointing the frame members 3, 4) as in a state that the upper face plate 17 abuts to the lower surface of the outer frame 1 (lower face of the lower web 6 of the frame members 3, 4). Then, as shown in FIG. 4(b) a bolt 23 is passed through the bolt hole 22 and the hole 19 from the lower surface of the lower plate to be screwed together with the blind nut 16 so that the lower plate 2 and the outer frame 1 (the frame member 3, 4) are fastened to each other. Thereby, lower plate 2 is jointed to the lower portion of the frame 1.

Figure 4:
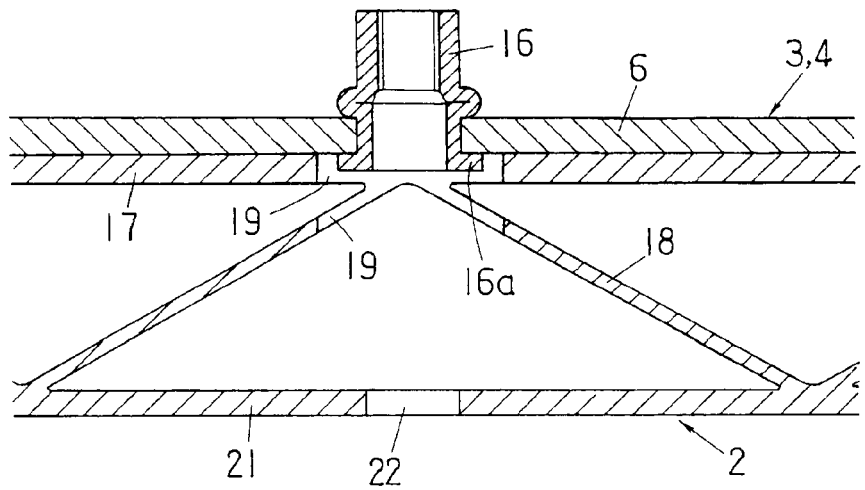
FIG. 4 shows a sectional view representing a substantial part of an example of a jointing configuration of the frame member and the lower plate in (a), and a side view representing a jointed shape in (b)
Figure 4:
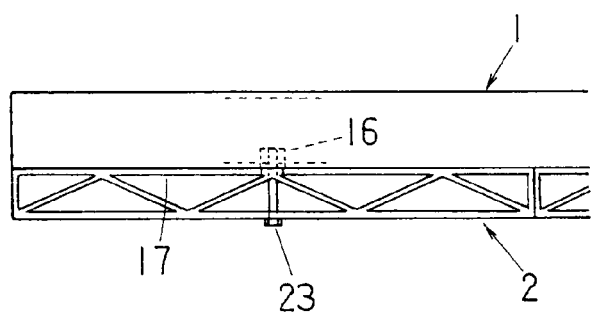
Figure 5:
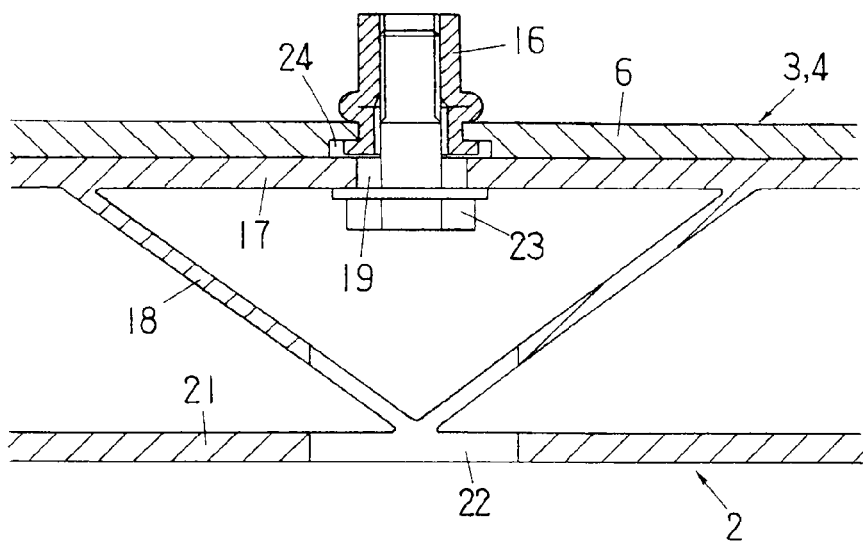
FIG. 5 is a sectional view representing a substantial part of an alternative example of a jointing configuration of the frame member and the lower plate.

FIG. 5 shows another example of a jointing configuration of the outer frame 1 (the frame member 3, 4) and the lower plate 2 using the blind nut. In the jointing configuration in FIG. 5, substantially same parts are denoted by same numerals as in FIG. 4.

In the jointing configuration shown in FIG. 5, the blind nut 16 is fixed to the lower web of the frame members 3, 4 at an appropriate interval as well. The hole in which the blind nut 16 engages is formed with a stepped portion 24 so that the stepped portion 24 contains the flange 16a of the blind nut 16. Meanwhile, corresponding to the blind nut 16, the bolt hole 19 is formed on the upper face plate 17 of the lower plate 2 and the bolt hole 22 is formed on a portion of the lower face plate 21 and the rib 18.

To joint the lower plate 2 and the outer frame 1, the bolt 23 is inserted into the bolt hole 22 from the lower surface of the lower plate 2, then the shaft portion of the bolt 23 is passed through the bolt hole 19 to be screwed in the blind nut 16 so that the lower plate 2 and the outer frame 1 (the frame member 3, 4) are fastened to each other. Thereby, lower plate 2 is jointed to the lower portion of the frame 1.

Notably, the joint bolt 23 in the jointing configuration in FIG. 5 is different from the bolt 23 (bolt penetrating the lower plate 2) in the jointing configuration in FIG. 4 in a point that the bolt 23 joints the upper face plate 17 of the lower plate 2 and the lower web of the outer frame 1 (the frame members 3, 4).

In the above battery frame, the frame 3, 4 is made of, for instance, an aluminum alloy extruded material of JIS 6000 series or 7000 series. A bending process for the corner portions can be any of various bending method such as draw bending, press bending. In order to enhance a bending ability of the bending portion (corner portion), the bending portion can be subjected to a restoration process, for instance by inductive heating, to increase an n value (work hardening coefficient), prior to the bending process.

In the above battery frame, the outer frame 1 is mounted in a vehicle body so that the straight shaped portion (non-bent region 3B, 4B) are oriented to the longitudinal direction or the width direction of the vehicle body. In this case, if an impact is applied in the longitudinal direction or the width direction of the vehicle body, the straight portions of the outer frame can be crashed in its axial direction so as to absorb the collision energy. Therefore, the outer frame 2 preferably consists of aluminum alloy extruded material which has advantageous axial crash characteristics (behavior to crush in its axial direction without cracking when an impulsive or static compression force is applied in the axial direction) (refer, for instance JP-2001-316750A).

A battery frame according to the present invention can be made in another form such as in various shapes as follow without limiting to the above examples.

(1) While the outer frame is generally rectangular shape in planar view in the above examples, the outer frame can be generally hexagonal shape, generally octagonal shape or generally another convex polygonal shape as necessary.

(2) While the sectional shape of the aluminum alloy hollow extruded material has a sectional shape as "☐" shape in the above examples, the sectional shape can be various shapes other than generally rectangle shape in outline as the above.

(3) While the two frame members are jointed by the bolt with the joint member in the above examples, the two frame members can be jointed by welding with or without the joint member (refer, for instance JP-2003-25094A). Alternatively, another jointing means can be arbitrarily applied.

(4) While the outer frame and the lower plate are jointed by the bolt in the above examples, the two can be jointed by welding. Alternatively, another jointing means can be arbitrarily applied.

(5) While the lower plate is formed in a complete rectangular shape in planar view in the above examples, the shape of the lower plate in planar view can be arbitrarily determined, for instance a shape having rounded corners corresponding to the outline of the outer frame, as long as it functions as a lower plate which supports a battery structure from below.

(6) While a bracket to mount the battery frame onto a vehicle body is not illustrated in the above examples, such bracket can be provided arbitrarily.

REFERENCE SIGN LIST

1 . . . Outer frame
2 . . . Lower plate
3, 4 . . . Frame member constituting outer frame
3A, 4A . . . Bending region of frame member
3a, 4a . . . Non-bended region of frame member
7 . . . Joint member
9 . . . Self piercing and clinch nut
13-15 . . . Double skin extruded material constituting lower plate
16 . . . Blind nut

What is claimed is:

1. A battery frame structure for an automobile, comprising:
an outer frame which has a generally convex polygonal shape in planar view and which has a uniform rectangular sectional shape, and
a lower plate which is joined to a lower surface of the outer frame and which is made from aluminum alloy,
wherein the outer frame comprises no more than two frame members which have an identical shape and which are joined to each other so that the ends of one of the frame members face the ends of the other frame member,
wherein each frame member is an aluminum alloy hollow extruded material which is bent in a single plane at two or more portions in its longitudinal direction.

2. The battery frame structure according to claim 1, wherein the outer frame has a generally rectangular shape in planar view, and the frame members are bent by 90° at two portions in the longitudinal direction.

3. A battery frame structure for an automobile comprising:
an outer frame which has a generally convex polygonal shape in planar view and which has a uniform rectangular sectional shape, and
a lower plate which is joined to a lower surface of the outer frame and which is made from aluminum alloy extruded plate,
wherein the outer frame comprises no more than two frame members which have an identical shape and which are joined to each other so that the ends of one of the frame members face the ends of the other frame member, and
wherein the each frame member is an aluminum alloy hollow extruded material which is bent in a single plane at two or more portions in its longitudinal direction.

4. The battery frame structure according to claim 3, wherein the lower plate is made from double skin shaped material.

5. The battery frame structure according to claim 4, wherein the lower plate comprises a pair of flat face plates extending parallel to each other and a plurality of ribs which are formed between and integrally with the flat face plates to connect the flat face plates.

* * * * *